(12) United States Patent
Lynch et al.

(10) Patent No.: US 9,940,569 B2
(45) Date of Patent: Apr. 10, 2018

(54) RFID TAG ASSEMBLY AND SURGICAL INSTRUMENT

(71) Applicant: Spa Track Medical Limited, Droitwich Spa (GB)

(72) Inventors: Mark Howard Lynch, Malvern (GB); Andrew O'Donnell, Holmfirth (GB); Martin Stanley Johnson, Southam (GB)

(73) Assignee: Spa Track Medical Limited, Droitwich Spa, Worcestershire (GB)

( * ) Notice: Subject to any disclaimer, the term of this patent is extended or adjusted under 35 U.S.C. 154(b) by 0 days.

(21) Appl. No.: 15/313,831

(22) PCT Filed: May 20, 2015

(86) PCT No.: PCT/GB2015/051474
§ 371 (c)(1),
(2) Date: Nov. 23, 2016

(87) PCT Pub. No.: WO2015/177538
PCT Pub. Date: Nov. 26, 2015

(65) Prior Publication Data
US 2017/0185884 A1 Jun. 29, 2017

(30) Foreign Application Priority Data
May 23, 2014 (WO) ............... PCT/GB2014/051589

(51) Int. Cl.
*G06K 19/06* (2006.01)
*G06K 19/077* (2006.01)

(52) U.S. Cl.
CPC . *G06K 19/07745* (2013.01); *G06K 19/07758* (2013.01); *G06K 19/07773* (2013.01)

(58) Field of Classification Search
CPC ............ G06K 19/07749; G07F 7/1008; G06Q 20/341
(Continued)

(56) References Cited

U.S. PATENT DOCUMENTS

2007/0262867 A1* 11/2007 Westrick .......... G06K 19/07749
340/572.7
2009/0128339 A1* 5/2009 Mitchell ................. B66F 17/00
340/572.8
(Continued)

FOREIGN PATENT DOCUMENTS

WO 2014045265 A1 3/2014

OTHER PUBLICATIONS

International Search Report dated Aug. 19, 2015, in International Patent Application No. PCT/GB2015/051474, filed on May 20, 2015.

*Primary Examiner* — Ahshik Kim
(74) *Attorney, Agent, or Firm* — Downs Rachlin Martin PLLC

(57) ABSTRACT

An RFID tag assembly (10) comprising: a passive mount-on-metal RFID tag (12) comprising an integrated circuit chip and an antenna provided on one side (14) of the RFID tag; a mounting base (16) made of an electrically conductive material; and a cover (18) made of a substantially RF transparent material and defining a recess (18*a*), wherein the RFID tag is mounted on the mounting base with said one side of the RFID tag coupled to a first side of the mounting base and wherein the cover is arranged over the RFID tag such that at least part of the RFID tag is located within the recess and the cover is fixed to the mounting base, such that the mounting base and the cover together encapsulate the RFID tag.

15 Claims, 6 Drawing Sheets

(58) Field of Classification Search
USPC .................................................. 235/492, 375
See application file for complete search history.

(56) References Cited

U.S. PATENT DOCUMENTS

| | | | |
|---|---|---|---|
| 2013/0037617 A1* | 2/2013 | Weakley | G06K 19/0723 235/492 |
| 2014/0131454 A1 | 5/2014 | Weisshaupt et al. | |
| 2015/0272690 A1* | 10/2015 | Deng | A61B 17/28 606/174 |
| 2016/0128798 A1* | 5/2016 | Bovet | G06K 19/07771 206/459.5 |

* cited by examiner

RFID TAG ASSEMBLY AND SURGICAL INSTRUMENT

TECHNICAL FIELD

The invention relates to an RFID tag assembly and to a surgical instrument having a said RFID tag assembly mounted thereon.

BACKGROUND

Passive radio-frequency identification, RFID, tags, which comprise an integrated circuit chip and an RF antenna, are well known and are widely used in asset tracking systems. The antenna performance, and thus the distance over which the RFID tag is able to communicate, can change in response to the surface on which an RFID tag is mounted. In particular, when an RFID tag is mounted on an object having a metal surface the antenna performance deteriorates, and the communication distance reduces. Recently, RFID tags which are capable of operating when mounted on a metal surface have been developed; these are known as 'mount-on-metal' RFID tags.

Sterilisation and disinfection of surgical instruments are essential components of infection-control procedures. There is also an increasingly felt need to ensure that no surgical instrument has been missed out from an instrument set required for a particular surgical procedure, misplaced during surgery or the sterilisation and disinfection process, or left inside a patient. It is therefore desirable to be able to track surgical instruments during use, and from the operating theatre, through the sterilisation and disinfection process, and back to the operating theatre. Many hospitals are also being required to maintain records of which surgical instruments have been used on which patients over the lifetime of the instrument, which can be several years.

The use of RFID tags for asset tracking of surgical instruments has been proposed, for example the RFID tag suitable for mounting on surgical instruments described in WO 2013/020944 and the ORLocate® RFID tag system provided by Haldor Advanced Technologies Ltd. However, the RFID tags in these systems are relatively large, so they can impede the use of a surgical instrument by a surgeon, and typically they must be read individually or in small groups on a special tray.

SUMMARY

It is an object to provide an improved RFID tag assembly. It is a further object to provide an improved surgical instrument.

A first aspect of the invention provides an RFID tag assembly comprising a passive mount-on-metal radio-frequency identification, RFID, tag, a mounting base and a cover. The passive mount-on-metal RFID tag comprises an integrated circuit, IC, chip and an antenna. The antenna is provided on one side of the RFID tag. The mounting base is made of an electrically conductive material. The cover is made of a substantially RF transparent material. The cover defines a recess for receiving at least part of the RFID tag. The RFID tag is mounted on the mounting base with said one side of the RFID tag coupled to a first side of the mounting base. The cover is arranged over the RFID tag such that at least part of the RFID tag is located within the recess and the cover is fixed to the mounting base, such that the mounting base and the cover together encapsulate the RFID tag.

The mounting base may provide consistent grounding of the RFID tag to a consistent electrically conductive mass, which may ensure consistent operation of the RFID tag irrespective of the size or shape of metal object on which the RFID tag assembly is mounted. The mounting base may mitigate the occurrence of detuning of the RFID tag which can occur when a passive mount-on-metal RFID tag is not properly grounded. This may increase the communication distance of the RFID tag.

In an embodiment, said one side of the RFID tag is close coupled to the first side of the mounting base. This may enable an optimal ground of the RFID tag to the mounting base.

In an embodiment, substantially the whole of said one side of the RFID tag is coupled to the first side of mounting base. This may enable an optimal ground of the RFID tag to the mounting base.

In an embodiment, the antenna has a longitudinal axis and an antenna plane. The RFID tag assembly further comprises a connector element extending outwardly from the mounting base. The connector element is provided generally at one end of the longitudinal axis of the antenna. The cover comprises a connector socket configured to receive and engage the connector element. Providing a connector element between the mounting base and the cover may improve the coupling between the connector element and the mounting base, and thus the encapsulation of the RFID tag. Providing the connector element generally at one end of the longitudinal axis of the antenna may reduce disruption of the antenna field by the connector element; in this location the connector element may be substantially outside the antenna field.

In an embodiment, the RFID tag assembly further comprises a further connector element extending outwardly from the mounting base. The further connector element is provided generally at a second end of the longitudinal axis of the antenna, opposite said one end. The cover comprises a further connector socket configured to receive and engage the further connector element. Providing two connector elements between the mounting base and the cover may improve the coupling between the connector element and the mounting base, and thus the encapsulation of the RFID tag. Providing each connector element generally at respective ends of the antenna may reduce disruption of the antenna field by the connector elements; in these locations the connector elements may be substantially outside the antenna field.

In an embodiment, the or each connector element extends generally orthogonally to the antenna plane. This may reduce disruption of the antenna field by a connector element; extending in this direction each connector element may be substantially outside the antenna field.

In an embodiment, the or each connector element is integral with the mounting base. The or each connector element is therefore formed from the same electrically conductive material as the mounting base. Forming each connector element integrally with the mounting base may help to keep the number of parts in the RFID tag assembly to a minimum.

In an embodiment, the or each connector is a mechanical clip comprising at least one projection adapted to engage with a corresponding socket provided in the cover. This may improve the coupling between the connector element and the mounting base, and thus the encapsulation of the RFID tag.

In an embodiment, the or each connector comprises a connector tab having a first part, extending from the mounting base, for location within the cover and a second part, at its distal end, adapted to extend outside the cover and to be folded over onto an external surface of the cover. This may improve the coupling between the connector element and the mounting base, and thus the encapsulation of the RFID tag.

In an embodiment, the mounting base has an engagement lip extending along at least part of its perimeter. The engagement lip at least partly defines a locating recess for locating the RFID tag on the first side of the mounting base. This may improve the coupling between the mounting base and the RFID tag.

In an embodiment, the cover further comprises a locating channel adapted to receive the engagement lip. This may improve the coupling between the mounting base and the RFID tag, and thus the encapsulation of the RFID tag.

In an embodiment, the antenna is dipole antenna comprising first and second antenna portions. Each antenna portion has a longitudinal axis and an antenna plane. The first antenna portion is provided on said one side of the RFID tag and the second antenna portion is provided on a second side of the RFID tag, generally opposite said one side. This may enable a larger antenna to be used while maintaining good grounding between the antenna and the mounting base. Providing the or each connector element generally at a respective end of the longitudinal axis of the antenna may reduce disruption of the antenna field by each connector element; in this location each connector element may be substantially outside the antenna field.

In an embodiment, the antenna is configured to transmit and received linearly polarised RF signals.

In an embodiment, the RFID tag is a ceramic passive mount on metal comprising a ceramic core. The antenna portions are provided on respective sides of the ceramic core and the IC chip is provided on one end of the ceramic core. The ceramic core may prevent inductive coupling between the antenna portions, which may ensure that the signal power of an RF return signal transmitted by the RFID tag is maintained at a preselected level. Maintaining a separation between the antenna portions with the ceramic core may ensure that the signal power of an RF return signal transmitted by the RFID tag is maintained at a preselected level.

In an embodiment, the electrically conductive material is one of a metal and a carbon-fibre composite. Using a metal mounting base may provide consistent grounding to metal of the RFID tag to a consistent mass, which may ensure consistent operation of the RFID tag irrespective of the size or shape of metal object on which the RFID tag assembly is mounted. The mounting base may mitigate the occurrence of detuning of the RFID tag which can occur when a passive mount-on-metal RFID tag is not properly grounded. This may increase the communication distance of the RFID tag.

In an embodiment, the metal is a medical grade stainless steel.

In an embodiment, the cover is made of a substantially electrically non-conductive material. This may prevent an electrical short circuit being formed between the antenna portions as a result of contact with an electrically conductive item. This may ensure that the signal power of an RF return signal transmitted by the RFID tag is maintained at a preselected level.

In an embodiment, the cover is made of at least one of a plastic, a ceramic and a rubber. This may prevent an electrical short circuit being formed between the antenna portions as a result of contact with an electrically conductive item. This may ensure that the signal power of an RF return signal transmitted by the RFID tag is maintained at a preselected level.

In an embodiment, the cover has a smooth external shape. This may minimize the risk of damage to a user's hand or gloves during use.

In an embodiment, the mounting base has a second side, generally opposite the first side. The second side is substantially smooth and substantially flat for close coupling to a metal body.

In an embodiment, the second side has a generally concave sectional shape for close coupling to a metal body having a complementary shape.

In an embodiment, the RFID tag assembly additionally comprises mechanical fixing apparatus arranged to mechanically fix the mounting element to a metal body.

A second aspect of the invention provides a surgical instrument comprising a metal body and having an RFID tag assembly mounted on the metal body. The RFID tag assembly comprises a passive mount-on-metal radio-frequency identification, RFID, tag, a mounting base and a cover. The passive mount-on-metal RFID tag comprises an integrated circuit, IC, chip and an antenna. The antenna is provided on one side of the RFID tag. The mounting base is made of an electrically conductive material. The cover is made of a substantially RF transparent material. The cover defines a recess for receiving at least part of the RFID tag. The RFID tag is mounted on the mounting base with said one side of the RFID tag coupled to a first side of the mounting base. The cover is arranged over the RFID tag such that at least part of the RFID tag is located within the recess and the cover is fixed to the mounting base, such that the mounting base and the cover together encapsulate the RFID tag.

The mounting base may provide consistent grounding of the RFID tag to a consistent electrically conductive mass, which may ensure consistent operation of the RFID tag irrespective of the size or shape of the surgical instrument. The mounting base may mitigate the occurrence of detuning of the RFID tag which can occur when a passive mount-on-metal RFID tag is not properly grounded. This may increase the communication distance of the RFID tag. Where the surgical instrument forms one of a pile of surgical instruments, the mounting base may improve the performance of each RFID tag, so that the RFID tag on each surgical instrument in the pile may be read simultaneously. The mounting base may mitigate the occurrence of detuning of the RFID tag which can occur when a passive mount-on-metal RFID tag is not properly directly attached to a metal surface. This may also increase the communication distance of the RFID tag. The RFID tag assembly may be smaller than the RFID tags proposed in the prior art for use with surgical instruments and the surgical instrument may therefore be used without the RFID tag assembly getting in the way of the surgeon or affecting the balance and movement of the surgical instrument.

In an embodiment, said one side of the RFID tag is close coupled to the first side of the mounting base. This may enable an optimal grounding of the RFID tag to the mounting base.

In an embodiment, substantially the whole of said one side of the RFID tag is coupled to the first side of the mounting base. This may enable an optimal ground of the RFID tag to the mounting base.

In an embodiment, the antenna has a longitudinal axis and an antenna plane. The RFID tag assembly further comprises a connector element extending outwardly from the mounting base. The connector element is provided generally at one end of the longitudinal axis of the antenna. The cover comprises a connector socket configured to receive and engage the connector element. Providing a connector element between the mounting base and the cover may improve the coupling between the connector element and the mounting base, and thus the encapsulation of the RFID tag. Providing the connector element generally at one end of the longitudinal axis of the antenna may reduce disruption of the antenna field by the connector element; in this location the connector element may be substantially outside the antenna field.

In an embodiment, the RFID tag assembly further comprises a further connector element extending outwardly from the mounting base. The further connector element is provided generally at a second end of the longitudinal axis of the antenna, opposite said one end. The cover comprises a further connector socket configured to receive and engage the further connector element. Providing two connector elements between the mounting base and the cover may improve the coupling between the connector element and the mounting base, and thus the encapsulation of the RFID tag. Providing each connector element generally at respective ends of the antenna may reduce disruption of the antenna field by the connector elements; in these locations the connector elements may be substantially outside the antenna field.

In an embodiment, the or each connector element extends generally orthogonally to the antenna plane. This may reduce disruption of the antenna field by a connector element; extending in this direction each connector element may be substantially outside the antenna field.

In an embodiment, the or each connector element is integral with the mounting base. The or each connector element is therefore formed from the same electrically conductive material as the mounting base. Forming each connector element integrally with the mounting base may help to keep the number of parts in the RFID tag assembly to a minimum.

In an embodiment, the or each connector is a mechanical clip comprising at least one projection adapted to engage with a corresponding socket provided in the cover. This may improve the coupling between the connector element and the mounting base, and thus the encapsulation of the RFID tag.

In an embodiment, the or each connector comprises a connector tab having a first part, extending from the mounting base, for location within the cover and a second part, at its distal end, adapted to extend outside the cover and to be folded over onto an external surface of the cover. This may improve the coupling between the connector element and the mounting base, and thus the encapsulation of the RFID tag.

In an embodiment, the mounting base has an engagement lip extending along at least part of its perimeter. The engagement lip at least partly defines a locating recess for locating the RFID tag on the first side of the mounting base. This may improve the coupling between the mounting base and the RFID tag.

In an embodiment, the cover further comprises a locating channel adapted to receive the engagement lip. This may improve the coupling between the mounting base and the RFID tag, and thus the encapsulation of the RFID tag.

In an embodiment, the antenna is dipole antenna comprising first and second antenna portions. Each antenna portion has a longitudinal axis and an antenna plane. The first antenna portion is provided on said one side of the RFID tag and the second antenna portion is provided on a second side of the RFID tag, generally opposite said one side. This may enable a larger antenna to be used while maintaining good grounding between the antenna and the mounting base. Providing the or each connector element generally at a respective end of the longitudinal axis of the antenna may reduce disruption of the antenna field by each connector element; in this location each connector element may be substantially outside the antenna field.

In an embodiment, the antenna is configured to transmit and received linearly polarised RF signals.

In an embodiment, the RFID tag is a ceramic passive mount on metal comprising a ceramic core. The antenna portions are provided on respective sides of the ceramic core and the IC chip is provided on one end of the ceramic core. The ceramic core may prevent inductive coupling between the antenna portions, which may ensure that the signal power of an RF return signal transmitted by the RFID tag is maintained at a preselected level. Maintaining a separation between the antenna portions with the ceramic core may ensure that the signal power of an RF return signal transmitted by the RFID tag is maintained at a preselected level.

In an embodiment, the electrically conductive material is one of a metal and a carbon-fibre composite. Using a metal mounting base may provide consistent grounding to metal of the RFID tag to a consistent mass, which may ensure consistent operation of the RFID tag irrespective of the size or shape of metal object on which the RFID tag assembly is mounted. The mounting base may mitigate the occurrence of detuning of the RFID tag which can occur when a passive mount-on-metal RFID tag is not properly grounded. This may increase the communication distance of the RFID tag.

In an embodiment, the metal is a medical grade stainless steel.

In an embodiment, the cover is made of a substantially electrically non-conductive material. This may prevent an electrical short circuit being formed between the antenna portions as a result of contact with an electrically conductive item, such as another surgical instrument or with part of a metal instrument tray in which the surgical instrument is located. This may ensure that the signal power of an RF return signal transmitted by the RFID tag is maintained at a preselected level.

In an embodiment, the cover is made of at least one of a plastic, a ceramic and a rubber. This may prevent an electrical short circuit being formed between the antenna portions as a result of contact with an electrically conductive item, such as another surgical instrument or with part of a metal instrument tray in which the surgical instrument is located. This may ensure that the signal power of an RF return signal transmitted by the RFID tag is maintained at a preselected level.

In an embodiment, the cover has a smooth external shape. This may minimize the risk of damage to a user's hand or gloves, or to a patient, during use.

In an embodiment, the mounting base has a second side, generally opposite the first side. The second side is substantially smooth and substantially flat and is close coupled to the metal body. This may ensure proper grounding of the RFID tag to the metal body of the surgical instrument, which may ensure consistent operation of the RFID tag irrespective of the size or shape of the surgical instrument. This may mitigate the occurrence of detuning of the RFID tag which can occur when a passive mount-on-metal RFID tag is not properly grounded. This may increase the communication distance of the RFID tag. Where the surgical instrument forms one of a pile of surgical instruments, this may improve the performance of each RFID tag, so that the RFID tag on each surgical instrument in the pile may be read simultaneously. This may mitigate the occurrence of detuning of the RFID tag which can occur when a passive mount-on-metal RFID tag is not properly directly attached to a metal surface. This may also increase the communication distance of the RFID tag. This may also improve coupling between the RIFD tag assembly and the surgical instrument, reducing the risk of the RIFD tag assembly falling off and reducing locations on which prions or other contaminants may become attached.

In an embodiment, the second side has a generally concave sectional shape. The metal body of the surgical instrument has a complementary shape. The second side of the mounting base is close coupled to the metal body. This may improve coupling between the RIFD tag assembly and the surgical instrument, reducing the risk of the RIFD tag assembly falling off and reducing locations on which prions or other contaminants may become attached.

In an embodiment, the RFID tag assembly additionally comprises mechanical fixing apparatus arranged to mechanically fix the mounting element to a metal instrument. This may improve coupling between the RIFD tag assembly and the surgical instrument, reducing the risk of the RIFD tag assembly falling off.

In an embodiment, the surgical instrument additionally comprises an encapsulation layer provided over the RFID tag assembly and a part of a surface of the surgical instrument around the RFID tag assembly. This may improve retention of the RFID assembly on the surface of the surgical instrument. Provision of an encapsulation layer may also soften any edges on the RFID assembly, which may reduce the probability of a surgeon using the instrument puncturing a surgical glove and which may reduce locations on which prions or other contaminants may become attached.

Embodiments of the invention will now be described, by way of example only, with reference to the accompanying drawings.

DETAILED DESCRIPTION

The same reference numbers will used for corresponding features in different embodiments.

Figure 1:
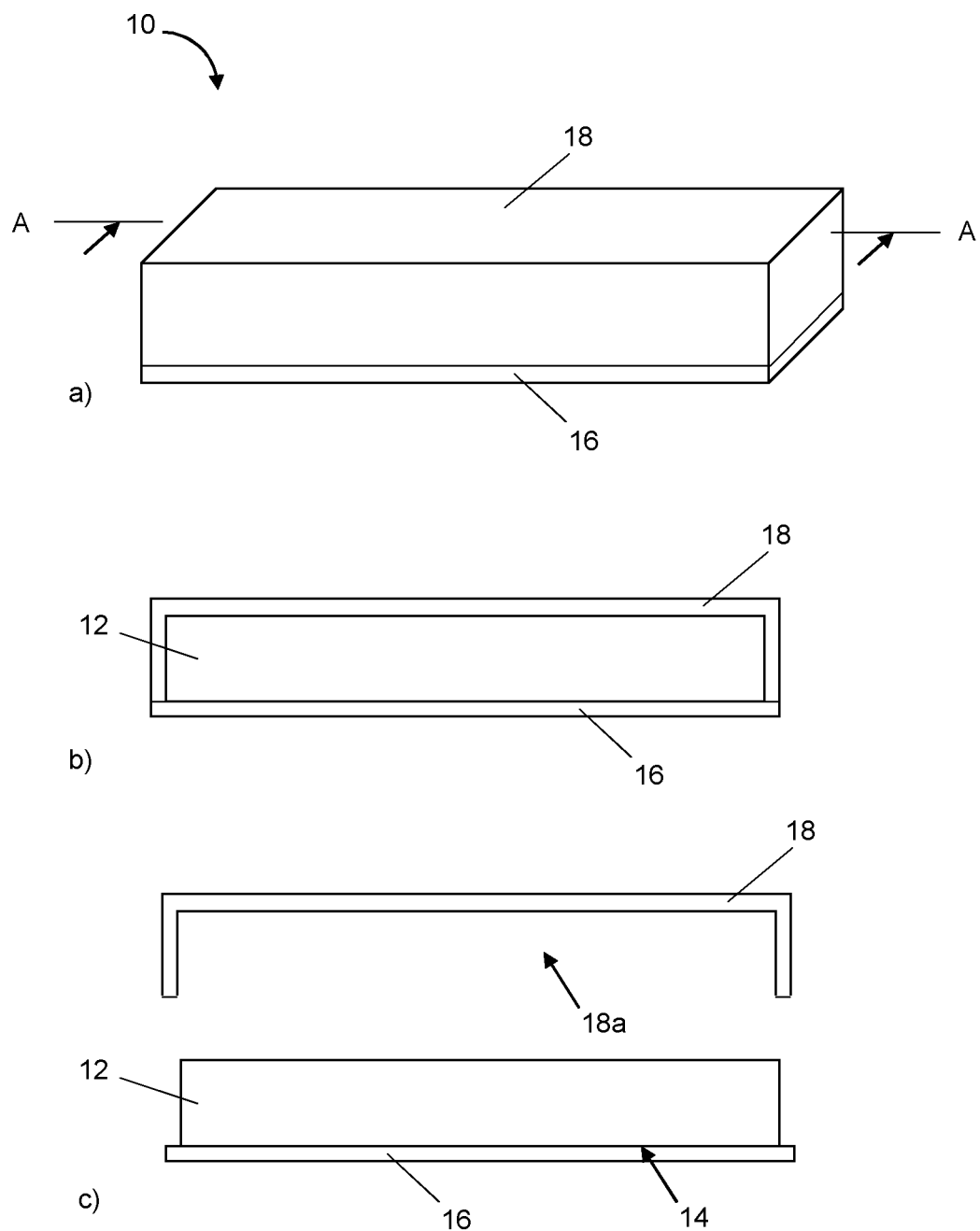
FIG. 1 is a schematic representation of an RFID tag assembly according to a first embodiment of the invention, a) from an isometric view; b) in a sectional view along line A-A of a); and c) in a part-exploded sectional view along line A-A of a)

Referring to FIG. 1, a first embodiment of the invention provides an RFID tag assembly 10 comprising a passive mount-on-metal RFID tag 12, a mounting base 16, and a cover 18.

It will be understood that the term mount-on-metal is used here to mean any passive RFID tag which is configured to operate when mounted on a metal surface or body.

The RFID tag of this embodiment has a general rectangular box shape, having a length, width and height. The RFID tag 12 is arranged to transmit an RF signal at a preselected frequency, typically within the UHF frequency spectrum region allocated to this application: 865-868 MHz in Europe) and 902-928 MHz in the United States.

The RFID tag 10 comprises an integrated circuit, IC, chip 40 and an antenna; the antenna is provided on one side 14 of the RFID tag. The construction of a passive mount-on-metal RFID tag will be well known to the skilled person therefore further details will not be included here.

The mounting base 16 is made of an electrically conductive material and the cover 18 is made of a material which is substantially RF transparent. The term RF transparent is used here to mean any material that does not interfere with the RF signals or has a negligible impact on RF signals transmitted through it.

The cover defines a recess 18a of a size and shape suitable to receive the RFID tag.

The RFID tag is mounted on the mounting base having its side 14 on which the antenna is provided coupled to a first side of the mounting base 16. The drawing shows the whole of the side 14 of the RFID tag coupled to the mounting base but it is acceptable to have less than the whole of the side of the RFID tag coupled to the mounting base so long as enough of the side is coupled to the mounting base to ensure consistent grounding of the RFID tag to the mounting base.

The cover is arranged over the RFID tag such that the RFID tag is located within the recess. The cover is fixed to the mounting base, such that the mounting base and the cover together encapsulate the RFID tag.

Figure 2:
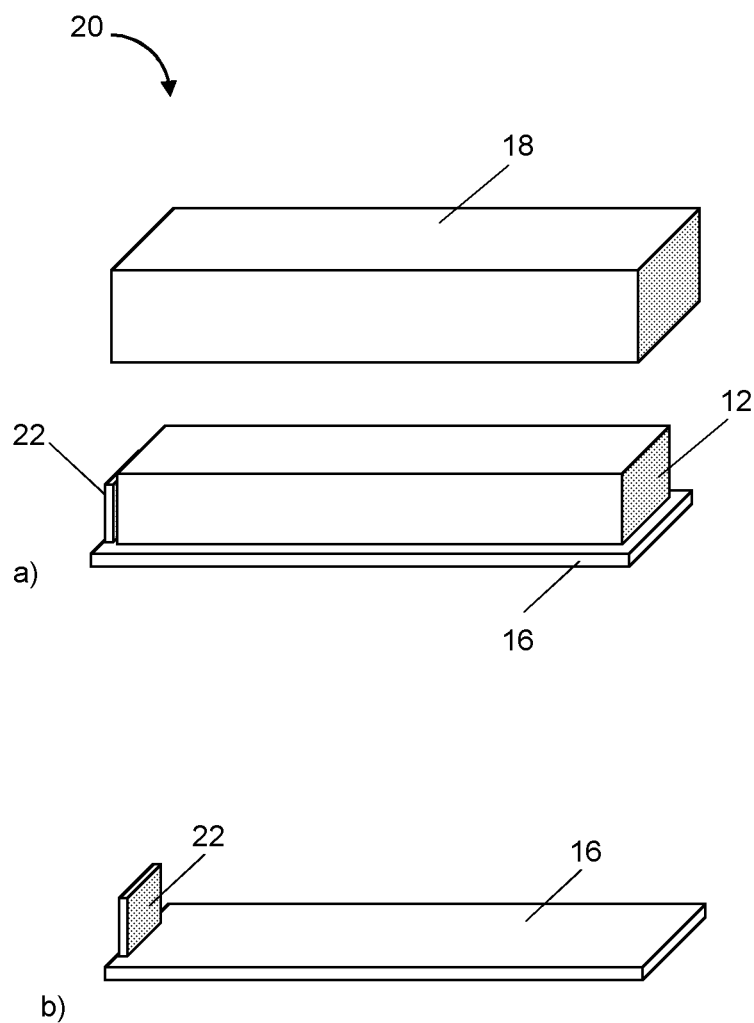
FIG. 2 shows a) a schematic part-exploded representation of an RFID tag assembly according to a second embodiment of the invention and b) the mounting base and connector element of a)

A second embodiment of the invention provides an RFID tag assembly 20, as shown in FIG. 2. The RFID tag assembly 20 of this embodiment is similar to the RFID tag assembly 10 of the previous embodiment, with the following modifications.

In this embodiment, the RFID tag assembly further comprises a connector element 22 extending outwardly from the mounting base 16. The RFID tag antenna has a longitudinal axis, arranged generally along the length of the RFID tag 18, and an antenna plane, arranged generally coplanar with the side 14 of the RFID tag. The connector element is provided generally at one end of the longitudinal axis of the antenna, i.e. generally at one end of the mounting base 16. The cover comprises a connector socket (not visible in FIG. 2) configured to receive and engage the connector element.

Figure 3:
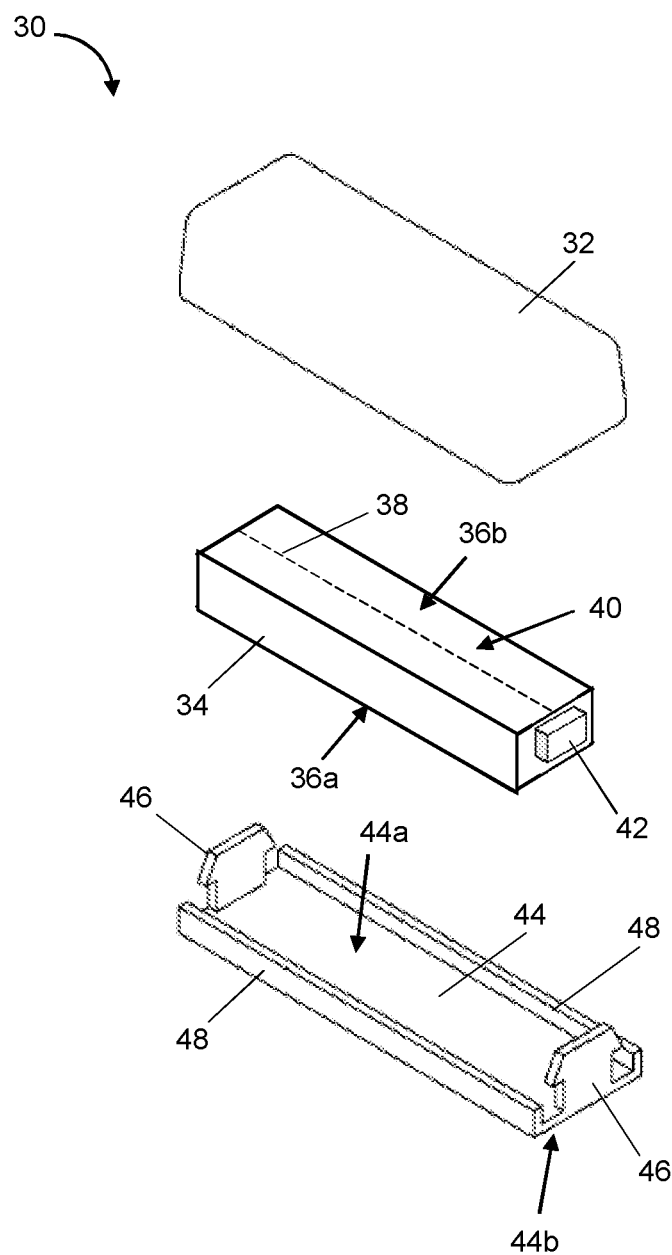
FIG. 3 is a schematic exploded representation of an RFID tag assembly according to a third embodiment of the invention.

Referring to FIG. 3, a third embodiment of the invention provides an RFID tag assembly 30 which is similar to the RFID tag assembly of the previous embodiment.

In this embodiment, the RFID tag assembly comprises first and second connector elements 46 provided on the mounting base 44. Each connector element is a mechanical clip having barbed projections at its distal end. The mounting base is also provided with two engagement lips 48, which extend along the longitudinal edges of the mounting base. The engagement lips define a locating recess for locating the RFID tag on the first side of the mounting base.

The mounting base 44 has a second side 44b, generally opposite the first side 44a. The second side is substantially smooth and substantially flat for close coupling to a metal body. The term 'substantially' is used to encompass any deviations from perfectly smooth and flat due to manufacturing tolerances, which the skilled person will recognise often arise during manufacturing processes.

The mounting base 44 of this embodiment is made of surgical stainless steel. It will be appreciated that other metals may be used, as may other electrically conductive materials such a carbon fibre composite.

The cover 32 comprises first and second connector sockets, provided internally at each end (not visible in FIG. 3) which are configured to receive and engage the connector elements 46. The cover 32 also has an elongate locating channel formed along the bottom of each elongate side, configured to receive a respective engagement lip. The cover 32 is made of an RF transparent plastic. It will be appreciated that other RF transparent materials may be used, such as a ceramic or rubber. The cover has a smooth external shape.

The RFID tag 34 comprises a dipole antenna comprising an IC chip 42, a ceramic core (not shown) and first and second antenna portions connected to the IC chip. The first and second antenna portions are separated by the antenna core. The first antenna portion is provided on one side of the ceramic core such that it is arranged generally at one side 36a of the RFID tag. The one side of the RFID tag is close coupled to the first side 44a of the mounting base 44. The second antenna portion is provided on an opposite side of the ceramic core, such that it is arrange generally at the opposite side 36b of the RFID tag. Each antenna portion has a longitudinal axis 38, arranged generally along the length of the RFID tag 34, and an antenna plane, arranged generally coplanar with the respective side of the RFID tag.

The connector elements 46 extend outwardly from the mounting base 44 at each end, generally orthogonally to the antenna plane.

Figure 4:
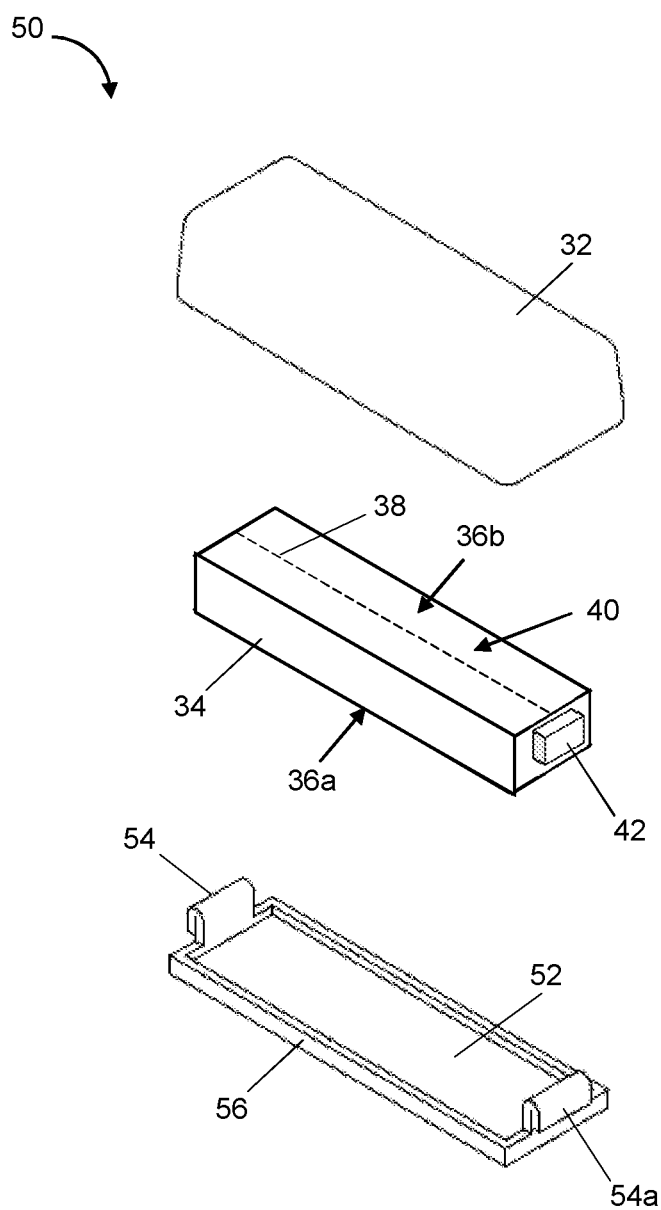
FIG. 4 is a schematic exploded representation of an RFID tag assembly according to a fourth embodiment of the invention.

Referring to FIG. 4, a fourth embodiment of the invention provides an RFID tag assembly 50 which is similar to the RFID tag assembly 30 of the previous embodiment, with the following modifications.

In this embodiment, the mounting base 52 is provided with an engagement lip 56 which extends around the full perimeter of the mounting base, to define a locating recess for the RFID tag 34. The connector elements 54 each takes the form of a mechanical clip folded over at its distal end to form a connector projection 54a, to engage with correspondingly located complementary shaped connector sockets (not visible) provided internally at each end of the cover 32.

Figure 5:
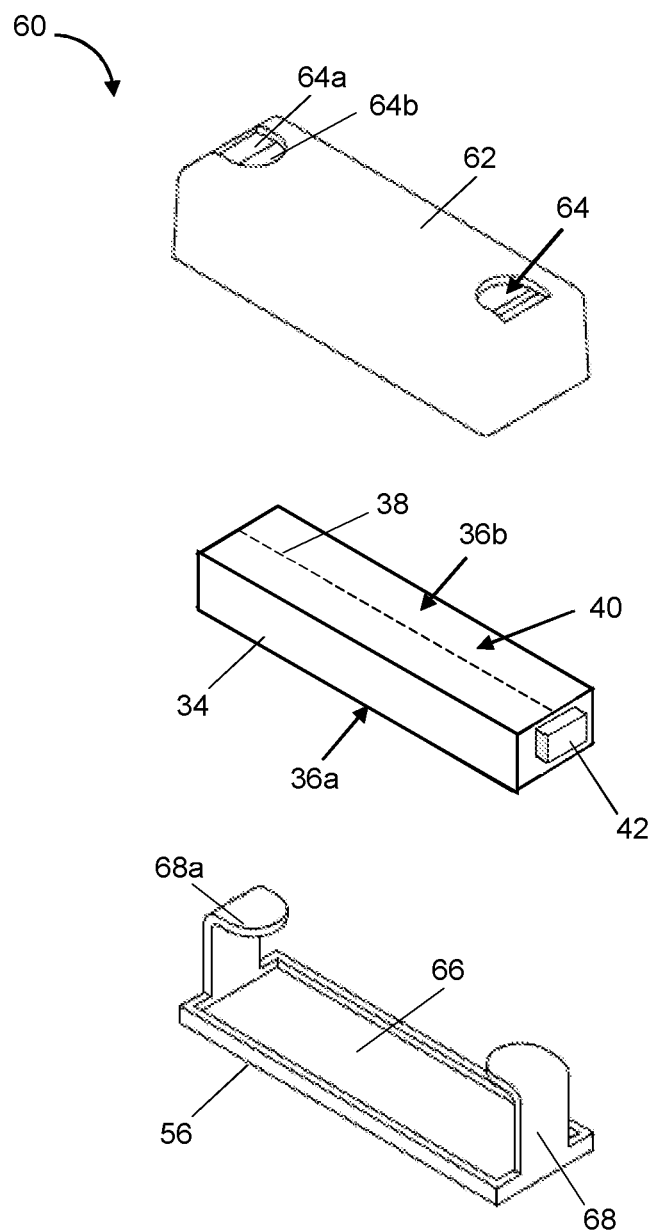
FIG. 5 is a schematic exploded representation of an RFID tag assembly according to a fifth embodiment of the invention.

Referring to FIG. 5, a fifth embodiment of the invention provides an RFID tag assembly 60 which is similar to the RFID tag assembly 50 of the previous embodiment, with the following modifications.

In this embodiment, the connector elements 68 each comprise a connector tab having a first part, extending from the mounting base 66, and a second part 68a, forming the distal end. The connector elements 68 are shown in their engaged form, with the second parts folded; for assembly of the RFID tag assembly the second parts extend upwardly from the first parts. The cover 62 has first and second connector sockets 64 provided in its top (as orientated in the drawings). Each connector socket 64 comprises an opening 64a and a recess 64b. During assembly, the second part 68a of each connector tab is located through the respective connector socket opening 64a and is then folded to locate within the respective recess 64b. The ends of the connector tabs therefore extend outside the cover 62, being folded over onto an external surface of the cover.

In a sixth embodiment, the RFID tag assembly 60 additionally comprises mechanical fixing apparatus arranged to mechanically fix the mounting base 66 to a metal instrument. The mechanical fixing apparatus comprises a generally U-shaped clamp and mechanical fixings which connect the clamp to the underside of the mounting base. The underside of the mounting base has a concave shaped section for location over part a metal instrument on which the RFID tag assembly is to be mounted. In use, the concave shaped section and the clamp are located around a metal instrument and secured together to clamp onto the metal instrument.

Figure 6:
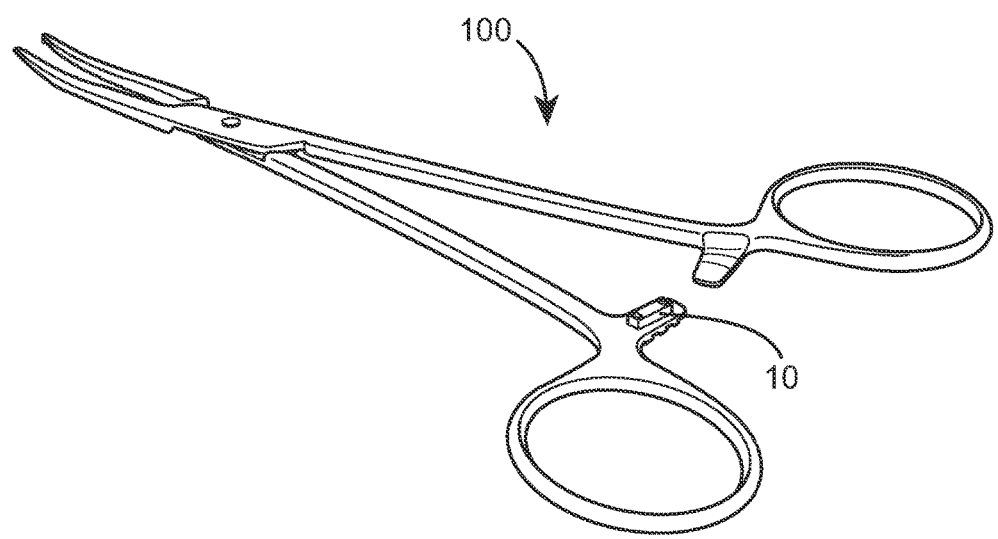
FIG. 6 is a schematic representation of a surgical instrument according to a seventh embodiment of the invention.

Referring to FIG. 6, a seventh embodiment of the invention provides a surgical instrument 100 comprising a metal body, in this embodiment a pair of Mosquito forceps, and having an RFID tag assembly 10 mounted on the metal body.

It will be appreciated that any of the RFID tag assemblies 20, 30, 50, 60 described with reference to FIGS. 2 to 5 may alternatively be used.

The RFID tag assembly 10 is mounted on the metal body of the forceps by laser or spot welding the mounting base 16 to the forceps 100. The mounting base may alternatively be bonded to the metal body of the forceps using an adhesive or may be mechanically fixed onto the forceps.

Figure 7:
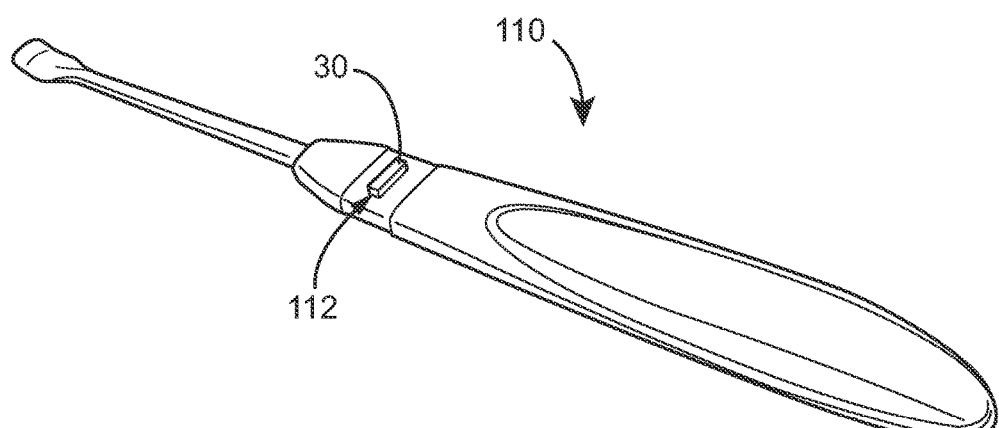
FIG. 7 is a schematic representation of a surgical instrument according to an eighth embodiment of the invention.

Referring to FIG. 7, an eighth embodiment of the invention provides a surgical instrument 110 comprising a metal body, in this embodiment a Splicer spoon. The surgical instrument has an RFID tag assembly 30 mounted on its metal body.

The mounting base 44 of the RFID tag assembly 30 is mounted on the metal body of the surgical instrument such that the substantially smooth, flat second side 44b of the mounting base is close coupled to the metal body; the mounting base therefore has close physical contact with the metal body of the surgical instrument.

The metal body of the surgical instrument is made of a ferrous metal, in this case surgical stainless steel.

It will be appreciated that any of the RFID tag assemblies 10, 20, 50, 60 described with reference to FIGS. 1, 2, 4 and 5 may alternatively be used.

The invention claimed is:

1. An RFID tag assembly comprising:
   a passive mount-on-metal RFID tag, the RFID tag comprising an integrated circuit chip and an antenna provided on one side of the RFID tag;
   a mounting base made of an electrically conductive material; and
   a cover made of a substantially RF transparent material and defining a recess, wherein the RFID tag is mounted on the mounting base with said one side of the RFID tag coupled to a first side of the mounting base and wherein the cover is arranged over the RFID tag such that at least part of the RFID tag is located within the recess and the cover is fixed to the mounting base, such that the mounting base and the cover together encapsulate the RFID tag.

2. An RFID tag assembly as claimed in claim 1, wherein said one side of the RFID tag is close coupled to the first side of the mounting base.

3. An RFID tag assembly as claimed in claim 1, wherein the antenna has a longitudinal axis and an antenna plane, the RFID tag assembly further comprises a connector element extending outwardly from the mounting base, the connector element being provided generally at one end of the longitudinal axis of the antenna and the cover comprises a connector socket configured to receive and engage the connector element.

4. An RFID tag assembly as claimed in claim 3, further comprising a further connector element extending outwardly from the mounting base, the further connector element being provided generally at a second end of the longitudinal axis of the antenna, opposite said one end, and wherein the cover comprises a further connector socket configured to receive and engage the further connector element.

5. An RFID tag assembly as claimed in claim 4, wherein at least one of the connector element and further connector element extends generally orthogonally to the antenna plane.

6. An RFID tag assembly as claimed in claim 5, wherein at least one of the connector element and further connector element is integral with the mounting base.

7. An RFID tag assembly as claimed in claim 1, wherein the mounting base has an engagement lip extending along at least part of its perimeter, the engagement lip at least partly defining a locating recess for locating the RFID tag on the first side of the mounting base.

8. An RFID tag assembly as claimed in claim 1, wherein the antenna is a dipole antenna comprising first and second antenna portions, the first antenna portion being provided on said one side of the RFID tag and the second antenna portion being provided on a second side of the RFID tag, generally opposite said one side.

9. An RFID tag assembly as claimed in claim 1, wherein the electrically conductive material is one of a metal and a carbon-fiber composite.

10. An RFID tag assembly as claimed in claim 9, wherein the metal is a medical grade stainless steel.

11. An RFID tag assembly as claimed in claim 1, wherein the cover is made of a substantially electrically non-conductive material.

12. An RFID tag assembly as claimed in claim 1, wherein the mounting base has a second side, generally opposite the first side, the second side being substantially smooth and substantially flat for close coupling to a metal body.

13. A surgical instrument comprising:
a metal body and;
an RFID tag assembly mounted on the metal body, the RFID tag assembly including:
a passive mount-on-metal RFID tag, the RFID tag comprising an integrated circuit chip and an antenna provided on one side of the RFID tag;
a mounting base made of an electrically conductive material; and
a cover made of a substantially RF transparent material and defining a recess, wherein the RFID tag is mounted on the mounting base with said one side of the RFID tag coupled to a first side of the mounting base and wherein the cover is arranged over the RFID tag such that at least part of the RFID tag is located within the recess and the cover is fixed to the mounting base, such that the mounting base and the cover together encapsulate the RFID tag.

14. A surgical instrument as claimed in claim 13, wherein the metal body is made of a ferrous metal.

15. A surgical instrument as claimed in claim 13, wherein the RFID tag assembly is mounted on the metal body such that a second side of the mounting base is in close coupled physical contact with the metal body.

* * * * *